United States Patent
Higashide

(10) Patent No.: US 7,626,898 B2
(45) Date of Patent: Dec. 1, 2009

(54) DISK DEVICE, AND POSITION DETERMINATION METHOD FOR PICKUP HEAD

(75) Inventor: Atsushi Higashide, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 344 days.

(21) Appl. No.: 11/782,677

(22) Filed: Jul. 25, 2007

(65) Prior Publication Data

US 2008/0025166 A1 Jan. 31, 2008

(30) Foreign Application Priority Data

Jul. 31, 2006 (JP) .............................. 2006-208685

(51) Int. Cl.
*G11B 7/00* (2006.01)
(52) U.S. Cl. .................. 369/44.28; 369/44.27
(58) Field of Classification Search .............. 369/44.28, 369/44.27, 44.26, 44.31, 44.33, 47.5, 47.51, 369/30.12, 44.32; 347/253, 225, 248
See application file for complete search history.

(56) References Cited

U.S. PATENT DOCUMENTS 7,362,348 B2 * 4/2008 Morishima ................... 347/253

FOREIGN PATENT DOCUMENTS

| JP | 05217182 | 8/1993 |
| JP | 2005332525 | 12/2005 |

* cited by examiner

*Primary Examiner*—Ali Neyzari
(74) *Attorney, Agent, or Firm*—Pillsbury Winthrop Shaw Pittman, LLP

(57) ABSTRACT

This disk device includes a pickup head (PUH), a PUH shift control unit, and an inner circumference position detection unit. The PUH reads out data upon a disk. The inner circumference position detection unit detects whether or not the PUH has shifted to the inner circumferential edge of the disk. And, after having stopped the PUH in the neighborhood of a position at which the detection state of the inner circumference position detection unit changes over, the PUH shift control unit determines a shift time period T5 for the PUH when a predetermined operation has been performed. And, by supplying power during the time period T7, the PUH is stopped at a predetermined position.

9 Claims, 3 Drawing Sheets

DISK DEVICE, AND POSITION DETERMINATION METHOD FOR PICKUP HEAD

CROSS REFERENCE

This Nonprovisional application claims priority under 35 U.S.C. § 119(a) on Patent Application No. 2006-208685 filed in Japan on Jul. 31, 2006, the entire contents of which are hereby incorporated by reference.

BACKGROUND OF THE INVENTION

Generally, a read in region is located at the innermost circumferential portion of a DVD (for example, of a DVD-RW), and in this region there is recorded a TOC (Table Of Contents), in which the running time period and the start position of each item are recorded. When replaying the DVD, in order to read out this TOC, a so-called "re-zero" or initialization operation is performed, in which the position of a pickup head ("PUH") is set to (i.e. is determined as being) this read in region, which is at a position 24.3 mm~25.8 mm from the inner circumferential edge of the DVD, and is stopped there.

However, more precisely, since sometimes there may be some deflection in the disk, the position to which the PUH is set and stopped in this re-zero operation is a predetermined position which is determined in the disk device in advance, "corresponding" to the read in region if, hypothetically, a disk were to be loaded in which the deflection is zero. In other words, the target position for performing the re-zero operation is determined as being, not by any means a position upon the disk, but rather with reference to a predetermined absolute position with respect to the disk device main body. In this specification it will be supposed that, when the technical terms "re-zero operation" and "position determination to within the read in region" are used, they are intended to convey this meaning.

A disk replay device which performs such position determination to within the read in region is disclosed in Japanese Laid-Open Patent Publication 2005-332525. In this patent document, the concept is described of, when a predetermined supply time period has elapsed during position determination of the PUH to the read region, supplying a re-zero braking pulse having a voltage value of 2 V~3 V to the thread motor. According to this method, it is possible to positionally determine the PUH to within the read in region, which is the target, in an accurate manner, irrespective of any variation in the minimum start voltage of the thread motor.

And, in Japanese Laid-Open Patent Publication Heisei 5-217182, there is disclosed a recording medium drive device which positionally determines the PUH to a position which corresponds to the read in region. In this patent document, a structure is disclosed in which the thread motor is driven and, by the PUH contacting against a switch which is provided at the inner circumferential edge and decelerating when this switch is turned ON, the PUH contacts against an end stop portion and the PUH is stopped. It is stated that, according to this structure, it is possible to perform position determination to the read in region in an accurate manner.

However, with the device described in Japanese Laid-Open Patent Publication 2005-332525, since the re-zero braking pulse voltage is supplied when performing position determination to within the read in region, it is necessary to perform adjustment by experiment, in order not to shift the PUH in the opposite direction. Furthermore, with this device described in Japanese Laid-Open Patent Publication 2005-332525, even though consideration is given to variation of the minimum start voltage of the feed motor, there is no concept of evaluating what may be the extent of the state of variation of this minimum start voltage in each individual case, so that there has been the problem that it cannot cope with long term change and the like. As a result, for example, the user has been subjected to various causes of apprehension, such as for example that, no matter how many times the re-zero operation may be performed, after loading a DVD he will not be able to play it.

And, with the method described in Japanese Laid-Open Patent Publication Heisei 5-217182, when reading out the read in region, since each time the PUH or the like contacts against the stop plate and is positionally determined by being stopped, accordingly the PUH or the like experiences a shock load each time even though it is decelerated, so there has been a fear that it may easily undergo long term change or damage.

The present invention has been conceived in consideration of the problems described above, and its object is, in the re-zero operation of a disk device, to evaluate the ease of performing shifting of the PUH in each individual case, and to perform position determination to within the read in region in a more accurate manner based upon this evaluation. Furthermore, the present invention also takes as its object, if the re-zero operation has failed, to evaluate the ease of performing shifting of the PUH in each individual case, while performing a retry of the re-zero operation (hereinafter termed a "short re-zero operation"), and to perform position determination to within the read in region in a more accurate manner based upon this evaluation.

SUMMARY OF THE INVENTION

The disk device of the present invention includes a pickup head, a pickup head shift control unit, and an inner circumference position detection unit.

The pickup head reads out data upon a disk.

The pickup head shift control unit supplies power to shift the pickup head along the radial direction of the disk.

The inner circumference position detection unit detects whether or not the pickup head has shifted to the inner circumferential edge of the disk And the pickup head shift control unit executes the following position determination operations in sequence:

(ST1): supplying power so that the pickup head shifts to the neighborhood of a position at which the detection/non-detection of the inner circumference position detection unit changes over, and stops;

(ST2): after the step ST1, supplying power so that the pickup head shifts in the direction towards the position at which the detection/non-detection by the inner circumference position detection unit changes over, and continuing to supply power over a time period T4 which is determined in advance to be sufficient for the detection/non-detection to change over;

(ST3): directly after the step ST2, starting supply of power to shift the pickup head in the opposite direction to the shift direction in the step ST2, and, when the detection/non-detection by the inner circumference position detection unit changes over, along with stopping the supply of power, also measuring the time period T5 from when this step ST3 started to when the detection/non-detection changed over; and (ST4): after the step ST3, starting supply of power to shift the pickup head in the direction of the disk outer circumference, and, after a time period T7 which is determined based upon the time period T5 has elapsed, stopping this supply of power.

DETAILED DESCRIPTION OF THE INVENTION

In the following, an optical disk device which is an embodiment of the present invention will be explained with reference to the drawings.

Figure 1:
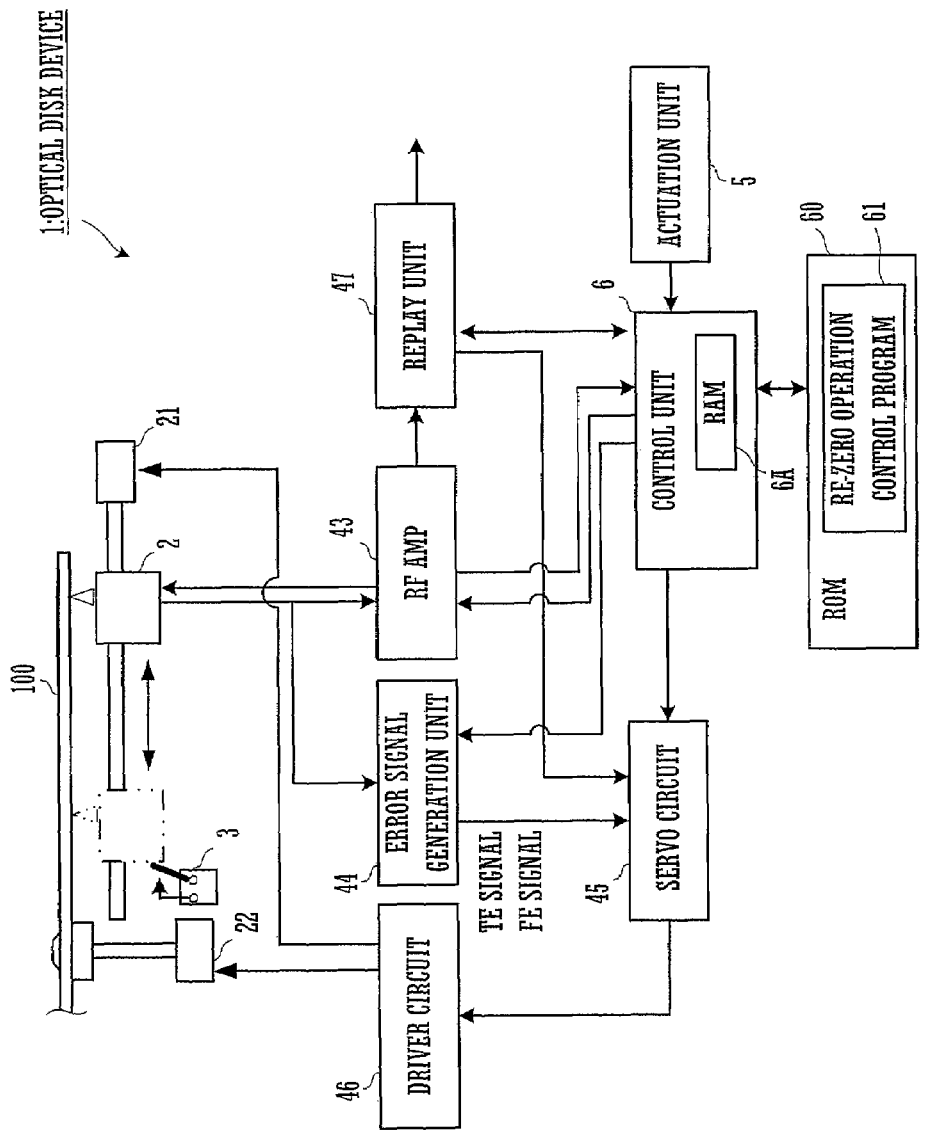
FIG. 1 is a block diagram showing the structure of the main portion of an optical disk device which is an embodiment of the present invention.

FIG. 1 is a block diagram showing the structure of the main portion of an optical disk device which is an embodiment of the present invention. The optical disk device 1 of this embodiment is a DVD player. It comprises a PUH (Pick Up Head) 2, a thread motor 21, a spindle motor 22, a switch 3, a RF amp 43, an error signal generation unit 44, a servo circuit 45, a driver circuit 46, a replay unit 47, an actuation unit 5, a control unit 6, and a ROM 60.

The PUH 2 comprises a laser diode (LD), a collimator lens, a beam splitter, an objective lens, a photodetector, a thread motor, and a two axis actuator, none of which are shown in the figures. And, during replay, the PUH 2 irradiates laser light of reading power upon an optical disk 100, and detects the light reflected from the optical disk 100 with the photodetector. By doing this, information which is recorded upon the optical disk 100 is read out optically.

The LD of the PUH 2 is a light source which outputs laser light. The photodetector is made up of a plurality of light reception elements, and detects (photoelectrically converts) the reflected light from the optical disk 100.

The objective lens of the PUH 2 adjusts the position of irradiation of the laser light upon the optical disk 100. Furthermore, the two axis actuator shifts the objective lens with respect to the optical disk 100 along the direction perpendicular to the optical disk 100, and along the radial direction of the optical disk 100.

The PUH 2 is fitted upon a shaft which is provided along the radial direction of the optical disk 100 so as to be able to shift freely thereupon, and a screw is also fitted so as to pass through the PUH 2.

The thread motor 21 rotates this screw which passes through the PUH 2, and thereby the PUH 2 is shifted in the radial direction of the optical disk 100. Due to this, the PUH 2 may be shifted over the disk along a predetermined radial direction thereof to a predetermined position. Either a forward or a reverse pulse voltage may be supplied to the thread motor 21, which applies corresponding drive force to the screw. The spindle motor 22 is driven by the servo circuit 45, and causes the optical disk 100 to rotate.

The switch 3 is provided at the inner circumferential edge of the disk 100, and has two opposed contact points. When the PUH 2 comes to a position at this inner circumferential edge, electrical continuity in the switch 3 is established by the PUH 2 pushing one of the two contact points of the switch 3 against the other. And the control unit 6 detects that the PUH 2 has arrived at the inner circumferential edge of the disk 100 by detecting that the switch 3 has gone to ON.

It should be understood that the switch 3 corresponds to the "inner circumference position detection unit" of the Claims. It will be sufficient if the "inner circumferential edge" which is detected by the switch 3 is a predetermined position upon the disk device which corresponds to a position which is more towards the inside of the disk than the read in region (in more detail, the region upon which information for reading the disk or recording upon it is recorded); it need not necessarily be the actual inner circumferential edge of the read region. The same is also the case for the "inner circumference position detection unit" of the Claims.

The RF amp 43 generates a RF signal based upon the reflected light from the optical disk 100 which has been detected by the plurality of light reception elements A through D which make up the photodetector provided to the PUH 2, amplifies this RF signal, shapes its waveform and the like, and outputs it to the replay unit 47. This RF signal is a read signal for the data which is recorded upon the optical disk 100.

The error signal generation unit 44 generates a focus error signal (hereinafter termed the FE signal) based upon the light reflected from the disk 100 which is detected by the plurality of light reception elements which make up the photodetector provided to the PUH 2, and outputs this FE signal to the servo circuit 45. Furthermore, this error signal generation unit 44 generates a tracking error signal (hereinafter termed the TE signal) likewise based upon the light reflected from the disk 100 which is detected by the plurality of light reception elements which make up the photodetector provided to the PUH 2, and outputs this TE signal to the servo circuit 45.

Based upon this FE signal and this TE signal which have been outputted by the error signal generation unit 44, the servo circuit 45 creates a focusing drive signal for bringing the value of the FE signal to zero (a reference level), and a tracking drive signal for bringing the value of the TE signal to zero (a reference level), and outputs these signals to the driver circuit 46.

The driver circuit 46 supplies the focusing drive signal to the actuator. Due to this, the driver circuit 46 shifts the objective lens of the PUH 2 along the direction of the optical axis. And, due to this, focus servo control is performed so as to match the focal point of the laser light to the recording surface of the optical disk 100. Moreover, the driver circuit 46 supplies the tracking drive signal, which is in pulse form, to the actuator, the thread motor 21, and the spindle motor 22. Due to this, the driver circuit 46 shifts the objective lens of the PUH 2 along the radial direction of the optical disk 100. And, due to this, tracking servo control is performed, so as to perform tracking to irradiate the laser beam upon the center of the track upon the optical disk 100. By performing the focus servo control and the tracking servo control described above, along with tracking the laser beam along the desired track, the focal point of the laser beam may also be matched to this track.

The thread motor 21, the error signal generation unit 44, the servo circuit 45, the driver circuit 46, and the control unit 6, as a group, together correspond to the "pickup head shift control unit" of the Claims.

The replay unit 47 digitalizes this RF signal, demodulates it and so on, and extracts video and audio data therefrom.

Furthermore, this replay unit 47 performs error correction, decodes the result, and creates a replay signal which it outputs to the exterior. This data may be error corrected, for example, according to a Reed-Solomon code. A predetermined value for the error rate is determined according to this method. Furthermore, this data may be, for example, encoded by MPEG.

The actuation unit 5 is a device for the user to input various types of command to this optical disk device 1, and it is provided with a replay key or a special replay key and stop key or the like. The commands which are thus inputted by the user to the optical disk device 1 are transmitted to the control unit 6. Furthermore, a remote control signal detection unit (not shown in the figures) is provided to the actuation unit 5. The user may input commands to this remote control signal detection unit by using an external remote control, not shown in the figures.

The control unit 6 may, for example, comprise a microcomputer. This control unit 6 also comprises a RAM 6A, which serves as a work field for use of the control program, and the like. And a ROM 60 is used for storing control data and control programs, such as a re-zero operation control program 61 and so on. When input has been received from the actuation unit 5, the control unit 6 executes these programs and performs various predetermined operations.

Figure 2:
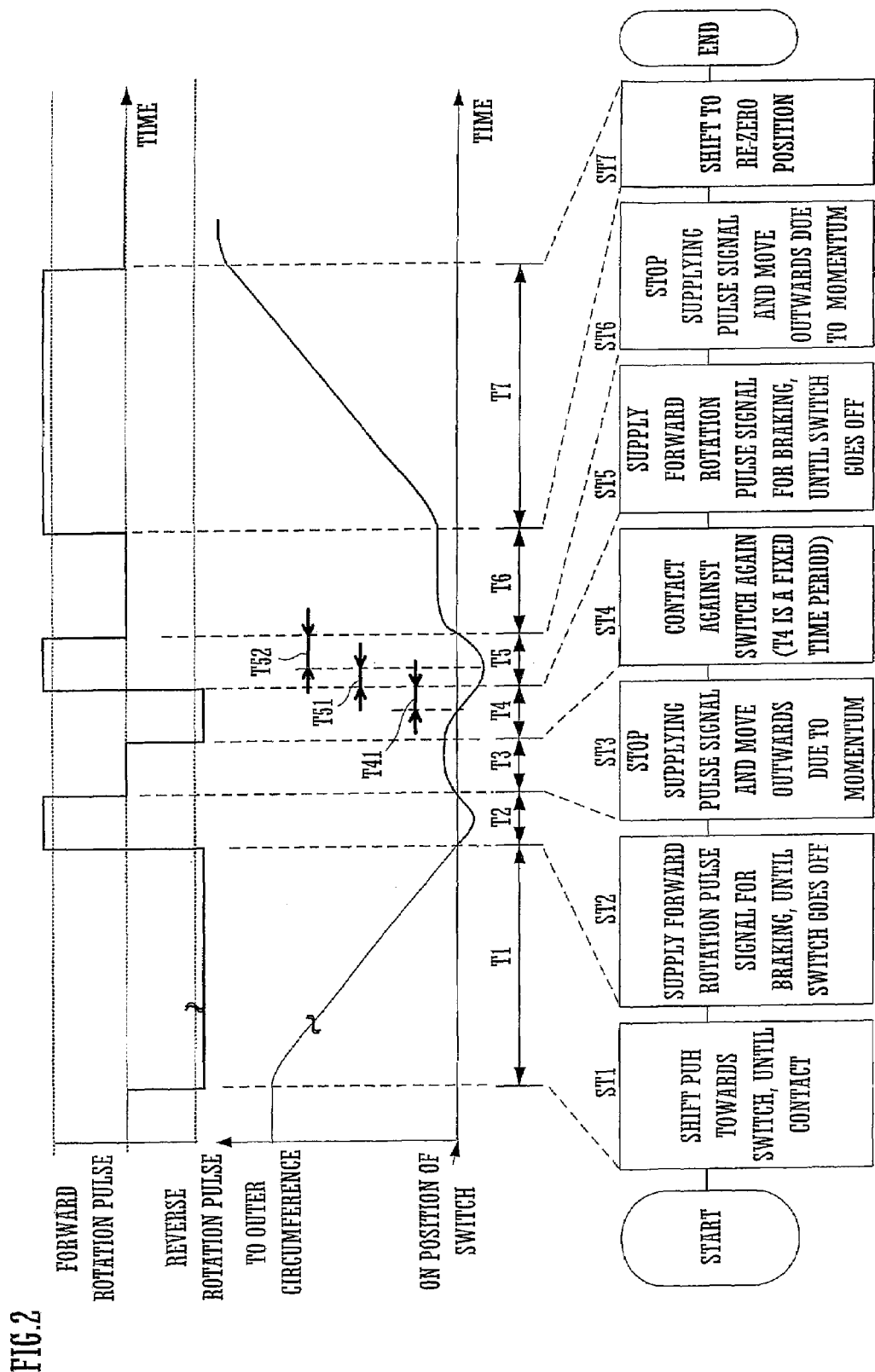
FIG. 2 is a figure showing a control procedure for a re-zero operation which is performed by a control unit of this optical disk device which is an embodiment of the present invention.

Using FIG. 2, the operation of the re-zero operation control program 61 will now be explained. The upper portion of FIG. 2 is a time chart showing the change over time of the pulse signal which is supplied to the thread motor 21. To recapitulate, the thread motor 21 shifts the PUH 2 in the radial direction of the disk 100. The middle portion of FIG. 2 corresponds to its upper portion, and shows this shifting of the PUH 2 in the radial direction. And the lower portion of FIG. 2 shows the various steps of the re-zero operation control program 61 corresponding to the time periods T1 through T7 shown in the middle portion of FIG. 2. It should be understood that, in the upper portion of FIG. 2, it is supposed that a forward rotation pulse supplies power to the PUH 2 so as to shift it in the direction of the outer circumference of the disk 100. Conversely, it is supposed that a reverse rotation pulse supplies power to the PUH 2 so as to shift it in the direction of the inner circumference of the disk 100.

In the following, the steps shown in the lower portion of FIG. 2 will be explained.

<ST1> The control unit 6 supplies a reverse rotation pulse signal to the thread motor 21, so that the PUH 2 shifts from some outer position towards the switch 3 at the inner circumferential disk edge. This continues until the PUH 2 contacts against the switch 3. The time period T1 differs according to the initial position of the PUH 2.

<ST2> After the step ST1, a forward rotation pulse signal is supplied to the thread motor 21 so as to shift it towards the outer circumferential disk edge, and thereby the PUH 2 is immediately braked. However, even after the step ST1, due to the momentum which it has received, the PUH 2 continues to shift further towards the inner circumferential disk edge. After the PUH 2 has been braked by this forward rotation pulse signal and its shifting towards the inner circumferential disk edge has stopped, then it starts to shift back towards the outer circumferential disk edge. Thereafter, the forward rotation pulse signal continues to be supplied to the thread motor until the PUH 2 is shifted to reach a position in which the switch 3 goes to OFF. The time period T2 for this step ST2 differs according to the initial position of the PUH 2, and according to the ease by which shifting of the PUH 2 is performed.

<ST3> During a period T3 from when the PUH has been shifted to where the switch 3 goes to OFF, the supply of the pulse signal for driving the thread motor 21 is stopped. During this period T3, after having been shifted to where the switch 3 goes to OFF due to the forward rotation pulse signal which was supplied in the step ST2, the PUH 2 further shifts towards the outer circumferential disk edge due to its momentum. The period T3 is set to be a time period which is sufficient for the shifting of the PUH 2 due to its momentum to stop.

<ST4> During a period T4 which is determined in advance, a reverse rotation pulse signal is supplied to the thread motor 21. This period T4 is set to be a time period which is sufficient for the switch 3 to again go to ON, and, during this period T4, after the switch has gone again to ON, the PUH 2 shifts further towards the inner circumferential disk edge.

<ST5> After the step ST4, in the same manner as in the step ST2, a forward rotation pulse signal is supplied to the thread motor 21 so as to shift the PUH 2 towards the outer circumferential disk edge, i.e. so as directly to apply braking. And even after this step ST4, due to its momentum, the PUH 2 continues to further shift towards the inner circumferential disk edge. After the shifting of the PUH 2 towards the inner circumferential disk edge stops due to the application of braking by the forward rotation pulse signal, it starts to shift back towards the outer circumferential disk edge. And thereafter as well, the supply of the forward rotation pulse signal to the thread motor 21 continues, and the shifting of the PUH 2 continues, until a position at which it leaves the inner circumferential edge region in which the switch 3 is turned ON.

Here, the reason for the switch 3 to be turned ON twice due to the steps ST1 through ST4, is in order temporarily to suppress variation of the momentum of the PUH 2 based upon individual differences, since, in the step ST1, the PUH 2 is shifted from an arbitrary remote position to the inner circumferential disk edge, and accordingly the PUH 2 acquires a momentum corresponding to the distance through which it has shifted. Since, in this manner, the momentum of the PUH 2 is suppressed in advance, accordingly any influence of the position of the PUH 2 before the step ST1 upon the length of the time period T5 which is required for the step ST5 is eliminated. Accordingly, the time period T5 only varies according to the ease of performing shifting of the PUH 2. In other words, the ease of performing shifting of the PUH 2 may be measured as an indication of the time period T5.

It should be understood that the steps ST1 through ST3 in FIG. 2 are not to be considered as limitative; provided that it was possible to shift the pickup head PUH 2 to the neighborhood of the position at which the switch 3 changes between detecting it and not detecting it, and to stop it, it would also be acceptable to perform shifting in any desired types of step, instead of via the steps ST1 through ST3. Furthermore, by repeating the step ST2 of FIG. 2, it would also be possible to approach more closely the position at which the switch 3 changes over.

<ST6> During the time period T6 of the step ST6, in a similar manner to the step ST3, the driving pulse signal supplied to the thread motor 21 is stopped. During this period T6, after the PUH 2 has been shifted, due to its momentum, to its position where the switch 3 is turned OFF by the forward rotation pulse signal which was supplied in the step ST5, the PUH 2 further shifts towards the outer circumferential disk edge. This period T6 is set to a time period which is sufficient for this shifting of the PUH 2 due to its momentum to stop.

<ST7> The supply of a forward rotation pulse signal to the thread motor 21 so as to shift the PUH 2 in the direction of the outer disk circumference is started, and is continued for a time period T7, so that the PUH 2 is shifted to its re-zero position. This time period T7 is determined based upon the time period T5 of the step ST5. As explained with reference to the step ST5, the time period T5 only differs depending upon the ease with which shifting of the PUH 2 can be performed.

Now, using FIG. 2, the relationship between the time period T5 and the ease with which shifting of the PUH 2 can be performed will now be explained. In the following, the time period T5 will be explained as being divided into the two time periods T51 and T52, as shown in FIG. 2. Here, T51 is the time period over which the PUH 2 shifts towards the inner circumferential disk edge due to its own momentum (in other words, the time period until the shifting of the PUH 2 towards the inner circumferential disk edge stops). And the time period T52 is the time period, after the PUH 2 has finally stopped at the end of the time period T51, over which the PUH 2 shifts towards the outer circumferential disk edge until the switch 3 goes OFF.

<If the PUH Can Be Shifted Only With Difficulty>

<About T51> If the PUH 2 can be shifted only with difficulty, then the internal friction of the construction for shifting the PUH 2 is high, and the time period T51 should be short, since the PUH 2 stops easily.

<About T52> If the PUH 2 can be shifted only with difficulty, then, since the distance over which the PUH 2 must shift during the time period T52 is short (corresponding to its shift distance during the time period T51 being short), accordingly this shifting time period T52 should be short. On the other hand, the stationary frictional force is high, so that it takes a long time period until shifting of the PUH 2 towards the outer circumferential disk edge starts.

<If the PUH Can Shift Easily>

<About T51> If the PUH 2 is easy to shift, then the internal friction of the construction for shifting the PUH 2 is low, and the time period T51 should be long, since the PUH 2 stops only reluctantly.

<About T52> If the PUH 2 is easy to shift, then, since the distance over which the PUH 2 must shift during the time period T52 is long (corresponding to its shift distance during the time period T51 being long), accordingly this shifting time period T52 should be short. On the other hand, the stationary frictional force is low, so that it takes a short time period until shifting towards the outer circumferential disk edge starts.

As described above, the disparity during the time period T52 between the "shift time period" and the "time period until shifting starts" for when the PUH 2 can be shifted only with difficulty, and for when the PUH 2 can shift easily, is offset, so that, since there is no large disparity, if the PUH 2 can be shifted only with difficulty, then the time period T51 is short and overall the time period T5 becomes short, whereas, if the PUH 2 can shift easily, then the time period T5 becomes long.

Accordingly, if the time period T5 is short, then it is determined that this is a case in which the PUH 2 can be shifted only with difficulty, and the time period T7 is set to be long. On the other hand, if the time period T5 is long, then it is determined that this is a case in which the PUH 2 can shift easily, and the time period T7 is set to be short. By adjusting the time period T7 based upon the time period T5 in this manner, it is possible to shift the PUH 2 to within the read in region in a more accurate manner, even if variation during manufacture has occurred with regard to the ease of performing shifting of the PUH 2.

The above explanation of FIG. 2 will now be supplemented.

The control unit 6 calculates the time period T7 during the step ST6. Furthermore although, in the above embodiment, the time period T7 was calculated based upon the time period T5, it would also be acceptable to calculate T7 based upon the time period T51. In this case, in order to calculate the time period T51, it would be acceptable to additionally provide a structure for detecting the shifting direction of the PUH 2, for example (a) a structure which detects the rotational direction of the thread motor 21, or which detects the rotational direction of the above described screw which passes through the PUH 2, or (b) a structure which counts the track number upon the surface of the optical disk 100, or to additionally provide a structure for detecting stopping of the PUH 2.

Furthermore, instead of making the time period T4 constant, it would also be acceptable to make the time period T41, after the switch 3 has gone to ON, constant. Here, the reason for keeping this time period T4 constant is in order to evaluate the ease of performing shifting of the PUH 2 under fixed conditions. In concrete terms, the ease of performing shifting of the PUH 2 is evaluated during the time period from its state in which it has progressed a fixed distance, until, after having supplied power to the PUH 2 so as to shift it in the opposite direction to its direction of progression, the detected state of the switch 3 has again changed over. If the time period after the switch 3 has gone to ON is made to be fixed, then it is possible to assess that the PUH 2 has progressed a fixed distance in the step ST4, irrespective of any variation in the difference between its position in the step ST3 and the position in which it contacts the switch 3. Furthermore, if this is done, since the disparity of the time period in the time period T4, until the movement of the PUH 2 starts, which is based upon the influence of the stationary frictional force, does not enter into the evaluation, accordingly it is possible to evaluate the ease of performing shifting of the PUH 2 in a more accurate manner by the measurement of the time period T5. Next, using FIG. 3, processing will be explained which is performed by the control unit 6 when retrying the re-zero operation (this will hereinafter be termed the "short re-zero operation") if the control for the re-zero operation performed as described above terminated in failure, for example if the PUH 2 did not arrive at the re-zero position or if it passed that position. This processing is executed as a subroutine of the re-zero control program 61.

Figure 3:
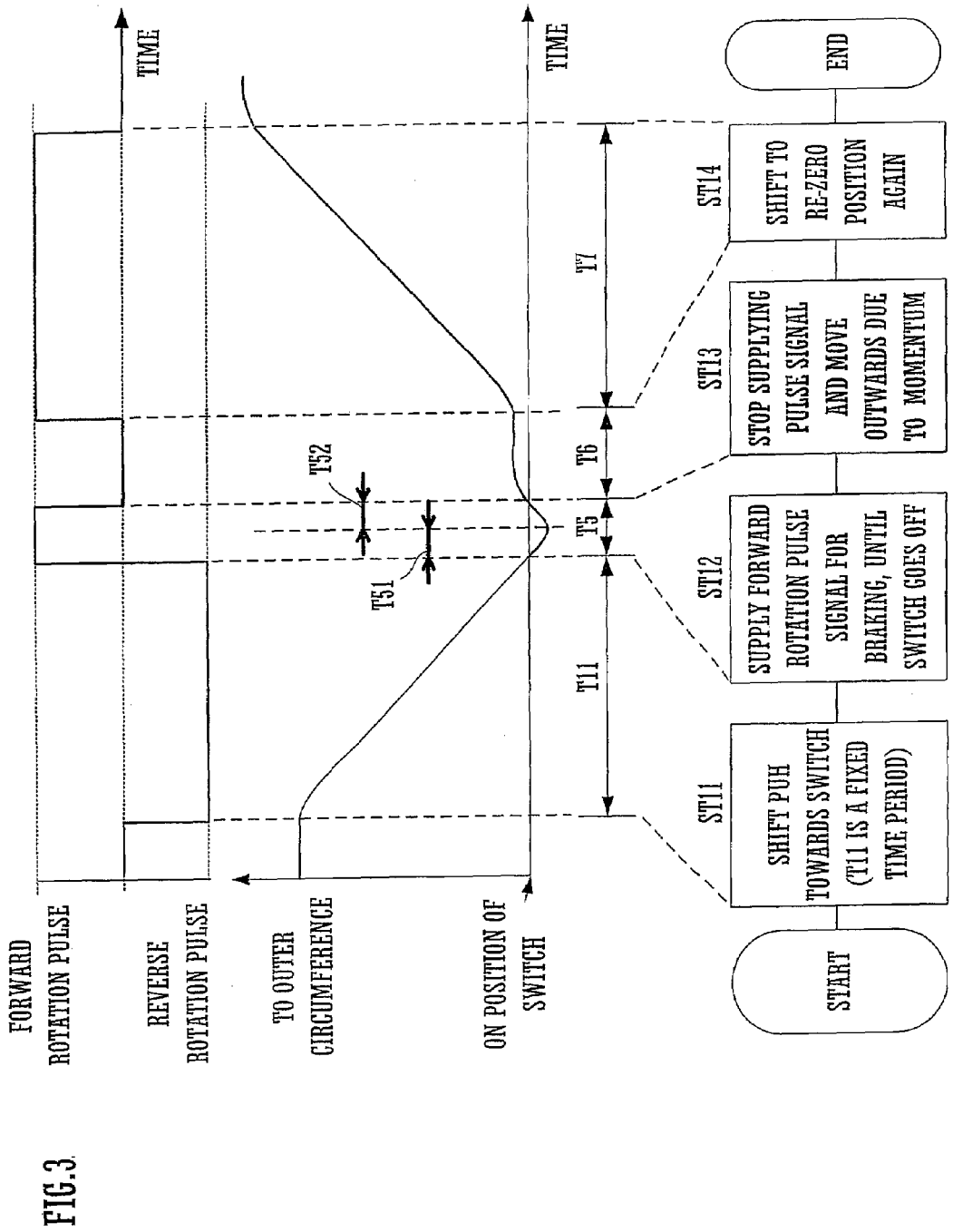
FIG. 3 is a figure showing a control procedure for a short re-zero operation which is performed by the control unit of this optical disk device which is an embodiment of the present invention, when a re-zero operation which it has already performed has failed.

FIG. 3 corresponds to FIG. 2, and shows the processing for contacting against the switch 3 for a second time, with the steps ST2 through ST4 omitted. The step ST11 corresponds to the stem ST1. And the steps ST12 through ST14 correspond respectively to the steps ST5 through ST7, and perform operations which are functionally identical thereto. The same reference symbols as in FIG. 2 are used for the time periods T5 through T7 of the various steps in FIG. 3, which perform the same operations as in FIG. 2.

<ST11> When this short re-zero operation is to be performed as well, a reverse rotation pulse signal is supplied to the thread motor 21, and the PUH 2 is shifted until it reaches a position in which it contacts against the switch 3. At this time, the distance which the PUH 2 has shifted through is the distance from somewhere in the read region to where the switch 3 goes to ON. Accordingly, since this distance is an approximately constant distance, it is considered that the variation will be rather small. On the other hand, since in the control procedure for the normal re-zero operation shown in FIG. 2 and described above the PUH 2 is shifted from "any" remote position to the inner circumferential disk edge, accordingly a momentum which corresponds to the shifting distance is imparted to the PUH 2. Thus, it is necessary to contact the PUH 2 against the switch 3 a second time, in order temporarily to suppress variation of this momentum based upon the shift distance. By contrast, in this short re-zero operation, processing which corresponds to the steps ST2 through ST4 of FIG. 2 is not performed.

<ST12> After the step ST11, a forward rotation pulse signal is supplied to the thread motor 21 so as to shift the PUH 2 towards the outer circumferential disk edge, i.e. so as directly to apply braking. And even after this step ST11, due to its momentum, the PUH 2 continues to further shift towards the inner circumferential disk edge. After the shifting of the PUH 2 towards the inner circumferential disk edge stops due to the application of braking by the forward rotation pulse signal, it starts to shift back towards the outer circumferential disk edge. And thereafter as well, the supply of the forward rotation pulse signal to the thread motor 21 continues, and the shifting of the PUH 2 continues, until a position at which it leaves the inner circumferential edge region and the switch 3 goes to OFF. Since, as previously described, the position of the PUH 2 before the shifting in the step ST11 is more or less within the read in region, accordingly the variation is much smaller than in the case of the control procedure for the normal re-zero operation; and the time period T5 of the step ST12 only varies according to the ease of performing shifting of the PUH 2. In other words, the ease of performing shifting of the PUH 2 may be measured as an indication of the time period T5.

<ST13> During the time period T6 from when the PUH 2 has been shifted to where the switch 3 goes to OFF, the driving pulse signal supplied to the thread motor 21 is stopped. During this period T6, after the PUH 2 has been shifted, due to its momentum, to its position where the switch 3 is turned OFF by the forward rotation pulse signal which was supplied in the step ST5, the PUH 2 further shifts towards the outer circumferential disk edge. This period T6 is set to a time period which is sufficient for this shifting of the PUH 2 due to its momentum to stop.

<ST14> The supply of a forward rotation pulse signal to the thread motor 21 so as to shift the PUH 2 in the direction of the outer disk circumference is started, and is continued for a time period T7, so that the PUH 2 is shifted to its re-zero position. This time period T7 is determined based upon the time period T5 of the step ST12. The method of determining the time period T5 is the same as the method of determining the time period T7 shown in FIG. 2; and, if the time period T5 is short, then it is decided on an individual basis that the PUH 2 can only be shifted with difficulty, and the time period T7 is made to be long. On the other hand, if the time period T5 is long, then it is decided on an individual basis that the PUH 2 can shift easily, and the time period T7 is made to be short.

The flow of FIG. 3 will now be supplemented. With the control procedure for this short re-zero operation as well, it would also be acceptable to determine the time period T7 based upon the time period T51 of FIG. 3. Here, T51 is the time period over which the PUH 2 shifts towards the inner circumferential disk edge due to its own momentum (in other words, the time period until the shifting of the PUH 2 towards the inner circumferential disk edge stops). And the time period T52 in FIG. 3 is the time period, after the PUH 2 has finally stopped at the end of the time period T51, over which the PUH 2 shifts towards the outer circumferential disk edge until the switch 3 goes OFF. The time period T51 in FIG. 3 corresponds to the time period T51 in the control procedure for the normal re-zero operation shown in FIG. 2, while the time period T52 in FIG. 3 corresponds to the time period T52 shown in FIG. 2. In this control procedure for this short re-zero operation, the time period T7 may be calculated based upon the time period T51. If the time period T51 is used in this manner, since "the degree to which braking is applied" is extracted more purely, accordingly it is possible to evaluate the ease of performing shifting of the PUH 2 in a more accurate manner than in the case of using the time period T5, and it is possible to shift the PUH 2 to within the read in region in a more accurate manner. With regard to the means for detecting the shift direction of the PUH 2, this is the same as in the case of the control procedure for the normal re-zero operation.

The above explanation of this embodiment will now be further supplemented.

A structure may also be employed in which data is maintained within the RAM 6A or a flash memory within the control unit 6, consisting of a correspondence relationship between any one of T5, T7, or T51 of FIG. 2 or FIG. 3 and successes and failures of the re-zero operation. If this type of structure is employed, it is possible to calculate the time period T7 in a more accurate manner based upon this data which is maintained. For example, if the time period T7 is different from that calculated by theory, and it often happens that, using the value which has been calculated, the PUH head 2 does not arrive within the read in region, then this may be learnt and the time period may be corrected so as to make it longer; or if it often happens that, using the value which has been calculated, the PUH head 2 passes over the read in region, then this may be learnt and the time period T7 may be corrected so as to make it shorter. Furthermore, since the steps ST2 through ST4 of FIG. 2 are performed in order to gather data upon T5, if the data is maintained in this manner, it will be sufficient to perform the processing of the steps ST2 through ST4 only once every certain number of times, and it will be possible to perform processing like that shown in FIG. 3 for supplying the pulse signal.

Moreover, the provision of the steps ST6 and ST13 is not necessarily required; without stopping the pulse signal as in the steps ST6 and ST13, it would also be acceptable to arrange to shift the PUH 2 continuously to within the read in region. Yet further, although the steps T5 through T7 of FIG. 2 and FIG. 3 have the same technical significance, it is not necessary to make the time period in them the same.

Even further, although in the above explanation the embodiment has been described as being an optical disk device, this is not limitative: the present invention may also be applied to any disk device in which a pickup head which reads out data from a disk is driven in the radial direction of the disk, and in which, when starting to use the disk device, data at a predetermined position upon the disk is read out. In this case, the pickup head is not necessarily an optical type pickup head; the present invention is applicable to the case of any head which functions to read out data upon the disk.

Furthermore, as far as the structure of the switch 3 is concerned, it will be sufficient if this switch is able to detect that the PUH 2 has arrived at the inner circumferential edge of the disk. For example, it would also be acceptable to employ a structure which does not utilize a contact type switch like the one shown in FIG. 2; in other words it would also be acceptable to arrange to detect the presence or absence of returned reflected light from the PUH 2 with a light reception element, using laser light, infrared light, or the like. Yet further, although in the above explanation it was described that contact against the switch 3 turned that switch 3 ON, while the switch 3 was OFF when no contact against it was taking place, this is not limitative; it would also be acceptable to employ a structure in which contact against the switch 3 turns the switch 3 OFF, while the switch 3 is ON when no contact against it was taking place. In such a case, the explanation of the present invention as described above is applicable, with ON and OFF being interchanged.

Moreover, as a means which is alternative to the thread motor 21, it would also be acceptable, for example, to provide a linear drive motor, or indeed to provide any structure which is capable of shifting the PUH 2 in the radial direction of the disk.

Yet further, in the above description, the re-zero operation was explained as "determining the position of the PUH and stopping it in the read in region". However, since sometimes the disk may be warped, more precisely, the position at which the position of the PUH is determined during the re-zero operation is a predetermined position which is determined in advance upon the disk device corresponding to the read in region, if it is hypothesized that an optical disk whose deviation is zero is mounted in the disk device. In other words, it is by no means a position upon the disk, but rather it is a target position for the re-zero operation to be performed, defined in reference to an absolute position upon the main body of the optical disk device 1.

What is claimed is:

1. A disk device comprising:
   a pickup head which reads out data upon a disk;
   a pickup head shift control unit which supplies power to shift said pickup head along the radial direction of said disk; and
   an inner circumference position detection unit which detects whether or not said pickup head has shifted to the inner circumferential edge of said disk;
   wherein said pickup head shift control unit executes the following operations in sequence:
   (ST1): supplying power so that said pickup head shifts to the neighborhood of a position at which the detection/non-detection of said inner circumference position detection unit changes over, and stops;
   (ST2): after the step ST1, supplying power so that said pickup head shifts in the direction towards said position at which the detection/non-detection by said inner circumference position detection unit changes over, and continuing to supply power over a time period T4 which is determined in advance to be sufficient for said detection/non-detection to change over;
   (ST3): directly after the step ST2, starting supply of power to shift said pickup head in the opposite direction to the shift direction in the step ST2, and, when the detection/non-detection by said inner circumference position detection unit changes over, along with stopping said supply of power, also measuring the time period T5 from when this step ST3 started to when said detection/non-detection changed over; and
   (ST4): after the step ST3, starting supply of power to shift said pickup head in the direction of the disk outer circumference, and, after a time period T7 which is determined based upon said time period T5 has elapsed, stopping this supply of power.

2. An optical disk device comprising:
   a pickup head which reads out data upon a disk;
   a pickup head shift control unit which supplies power to shift said pickup head along the radial direction of said disk; and
   an inner circumference position detection unit which detects whether or not said pickup head has shifted to the inner circumferential edge of said disk;
   wherein said pickup head shift control unit executes the following position determination operations in sequence:
   (ST1): starting supply of power to shift said pickup head in the direction towards the inner circumference of said disk, and stopping this supply of power when said inner circumference position detection unit detects that said pickup head has shifted to the inner circumferential edge of said disk;
   (ST2): directly after the step ST1, starting supply of power to shift said pickup head in the outer circumferential disk direction, and stopping said supply of power when said inner circumference position detection unit has detected that said pickup head has left the inner circumferential edge of said disk;
   (ST3): maintaining a state in which said supply of power is stopped during a time period T3 which is determined in advance;
   (ST4): starting supply of power to shift said pickup head in the direction towards the inner circumference of said disk, and maintaining said supply of power during a time period T4 which is determined in advance, and which is sufficient for said pickup head to shift to the inner circumferential edge of said disk;
   (ST5): directly after the step ST4, starting supply of power to shift said pickup head in the direction towards the outer circumference of said disk, and, along with stopping said supply of power when it has been detected by said inner circumference position detection unit that said pickup head has left said inner circumferential edge, also measuring the time period T5 from when this step ST5 started to when it has been detected that said pickup head has left said inner circumferential edge;
   (ST6): maintaining a state in which said supply of power is stopped during a time period T6 which is determined in advance; and
   (ST7): starting supply of power to shift said pickup head in the direction towards the outer circumference of said disk, and stopping this supply of power after a time period T7 which is determined based upon said time period T5.

3. A disk device comprising:
   a pickup head which reads out data upon a disk;
   a pickup head shift control unit which supplies power to shift said pickup head along the radial direction of said disk; and
   an inner circumference position detection unit which detects whether or not said pickup head has shifted to the inner circumferential edge of said disk;
   wherein, if it has not been possible to stop said pickup head in a predetermined position by a position determination operation which has already been performed, said pickup head shift control unit executes the following position determination operations in sequence:
   (ST11): starting supply of power to shift said pickup head in the direction towards the inner circumference of said disk, and stopping this supply of power when said inner circumference position detection unit detects that said pickup head has shifted to the inner circumferential edge of said disk;
   (ST12): directly after the step ST11, starting supply of power to shift said pickup head in the outer circumferential disk direction, and, along with stopping said supply of power when it has been detected by said inner circumference position detection unit that said pickup head has left said inner circumferential edge, also measuring the time period T5 from when this step ST12 started to when it has been detected that said pickup head has left said inner circumferential edge;
   (ST13): maintaining a state in which said supply of power is stopped during a time period T6 which is determined in advance; and
   (ST14): starting supply of power to shift said pickup head in the direction towards the outer circumference of said disk, and stopping this supply of power after a time period T7 which is determined based upon said time period T5.

4. A disk device as described in claim 1, further comprising a data integration means which maintains a data base in which indications which show the ease of performing shifting of said pickup head, and successes and failures of said re-zero operation, are maintained in mutual correspondence;
   and wherein said control unit determines an optimum value for said time period T7, based upon said data base.

5. A disk device as described in claim 1, further comprising a direction detection means which detects the shift direction of said pickup head in said radial direction of said disk;

and wherein, instead of measuring the time period T5, said control unit measures a time period T51 from the time instant at which the measurement of said time period T5 started, until the shifting direction of said pickup head in the radial direction changes, and determines said time period T7 based upon this time period T51.

6. A disk device as described in claim 1, wherein, instead of making said time period T4 be a fixed time period, said pickup head shift control unit supplies power so as to make the time period, in said time period T4, after the detection state of said inner circumference position detection unit changes over, be a fixed time period.

7. A position determination method for a pickup head, in which power is supplied to a pickup head which reads out data upon a disk, so as to shift said pickup head along the radial direction of said disk;

and wherein, using a position detection unit which detects whether or not said pickup head has shifted to the inner circumferential edge of said disk, position determination operations according to the following steps are performed in sequence:

(ST1): supplying power so that said pickup head shifts to the neighborhood of a position at which the detection/non-detection of said inner circumference position detection unit changes over, and stops;

(ST2): after the step ST1, supplying power so that said pickup head shifts in the direction towards said position at which the detection/non-detection by said inner circumference position detection unit changes over, and continuing to supply power over a time period T4 which is determined in advance to be sufficient for said detection/non-detection to change over;

(ST3): directly after the step ST2, starting supply of power to shift said pickup head in the opposite direction to the shift direction in the step ST2, and, when the detection/non-detection by said inner circumference position detection unit changes over, along with stopping said supply of power, also measuring the time period T5 from when this step ST3 started to when said detection/non-detection changed over; and (ST4): after the step ST3, starting supply of power to shift said pickup head in the direction of the disk outer circumference, and, after a time period T7 which is determined based upon said time period T5 has elapsed, stopping this supply of power.

8. A position determination method for a pickup head, in which power is supplied to a pickup head which reads out data upon a disk, so as to shift said pickup head along the radial direction of said disk;

and wherein, using a position detection unit which detects whether or not said pickup head has shifted to the inner circumferential edge of said disk, position determination operations according to the following steps are performed in sequence:

(ST1): starting supply of power to shift said pickup head in the direction towards the inner circumference of said disk, and stopping this supply of power when said inner circumference position detection unit detects that said pickup head has shifted to the inner circumferential edge of said disk;

(ST2): directly after the step ST1, starting supply of power to shift said pickup head in the outer circumferential disk direction, and stopping said supply of power when said inner circumference position detection unit has detected that said pickup head has left the inner circumferential edge of said disk;

(ST3): maintaining a state in which said supply of power is stopped during a time period T3 which is determined in advance;

(ST4): starting supply of power to shift said pickup head in the direction towards the inner circumference of said disk, and maintaining said supply of power during a time period T4 which is determined in advance, and which is sufficient for said pickup head to shift to the inner circumferential edge of said disk;

(ST5): directly after the step ST4, starting supply of power to shift said pickup head in the direction towards the outer circumference of said disk, and, along with stopping said supply of power when it has been detected by said inner circumference position detection unit that said pickup head has left said inner circumferential edge, also measuring the time period T5 from when this step ST5 started to when it has been detected that said pickup head has left said inner circumferential edge;

(ST1): maintaining a state in which said supply of power is stopped during a time period T6 which is determined in advance; and (ST7): starting supply of power to shift said pickup head in the direction towards the outer circumference of said disk, and stopping this supply of power after a time period T7 which is determined based upon said time period T5.

9. A position determination method for a pickup head, in which power is supplied to a pickup head which reads out data upon a disk, so as to shift said pickup head along the radial direction of said disk;

and wherein, if it has not been possible to stop said pickup head in a predetermined position by a position determination operation which has already been performed, using a position detection unit which detects whether or not said pickup head has shifted to the inner circumferential edge of said disk, position determination operations according to the following steps are performed in sequence:

(ST11): starting supply of power to shift said pickup head in the direction towards the inner circumference of said disk, and stopping this supply of power when said inner circumference position detection unit detects that said pickup head has shifted to the inner circumferential edge of said disk;

(ST12): directly after the step ST11, starting supply of power to shift said pickup head in the outer circumferential disk direction, and, along with stopping said supply of power when it has been detected by said inner circumference position detection unit that said pickup head has left said inner circumferential edge, also measuring the time period T5 from when this step ST12 started to when it has been detected that said pickup head has left said inner circumferential edge;

(ST13): maintaining a state in which said supply of power is stopped during a time period T6 which is determined in advance; and (ST14): starting supply of power to shift said pickup head in the direction towards the outer circumference of said disk, and stopping this supply of power after a time period T7 which is determined based upon said time period T5.

* * * * *